United States Patent

[11] 3,633,348

[72] Inventors Bobby Joe Sears
Hoopeston;
Olin L. Looker, Milford, both of Ill.
[21] Appl. No. 24,043
[22] Filed Mar. 25, 1970
[45] Patented Jan. 11, 1972
[73] Assignee FMC Corporation
San Jose, Calif.

[54] CORNPICKER HEAD WITH REVERSIBLE ROTOR BLADES
2 Claims, 6 Drawing Figs.

[52] U.S. Cl..................................................... 56/104,
130/5 C, 130/5 J
[51] Int. Cl..................................................... A01d 45/02

[50] Field of Search............................................ 56/103–112;
130/5 B, 5 C, 5 D, 5 G, 5 J

[56] References Cited
UNITED STATES PATENTS

| 3,429,111 | 2/1969 | Looker............. | 56/108 |
| 2,604,750 | 7/1952 | Fergason........... | 56/104 |
| 3,139,887 | 7/1964 | Karlsson et al..... | 56/104 X |
| 3,499,272 | 3/1970 | Looker............. | 56/109 X |

*Primary Examiner*—Louis G. Mancene
*Assistant Examiner*—J. A. Oliff
*Attorneys*—F. W. Anderson and C. E. Tripp

ABSTRACT: Identical square blade sleeves welded up in overlapping fashion are bolted to straight cylindrical shafts by inner end and central bolts, to provide end-to-end reversible blade assemblies.

PATENTED JAN 11 1972
3,633,348
SHEET 1 OF 3
FIG_1
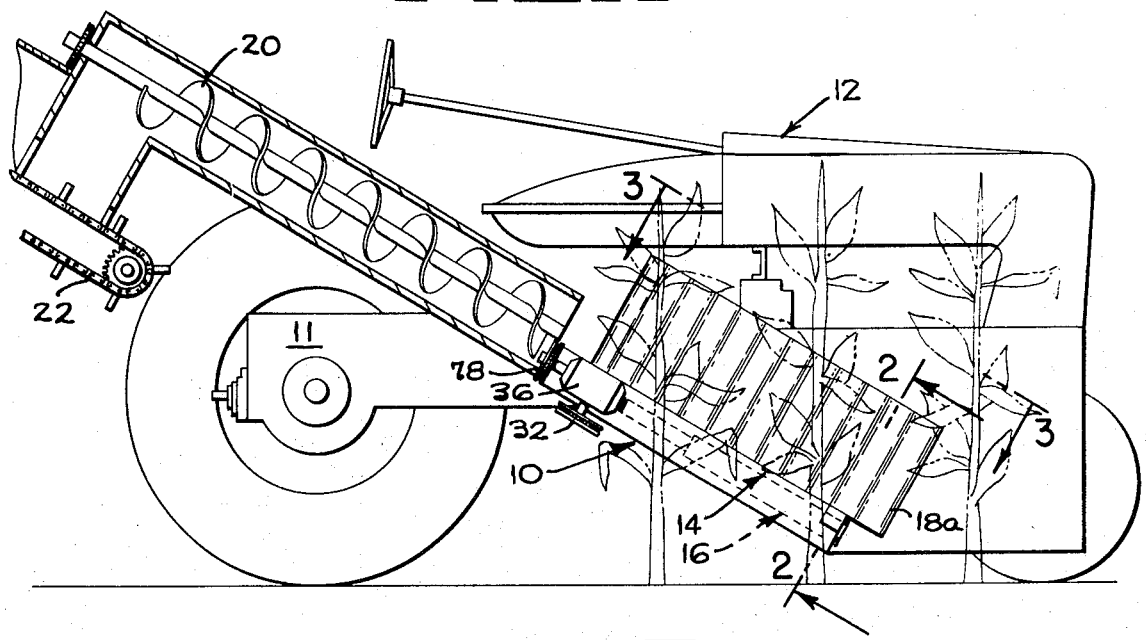
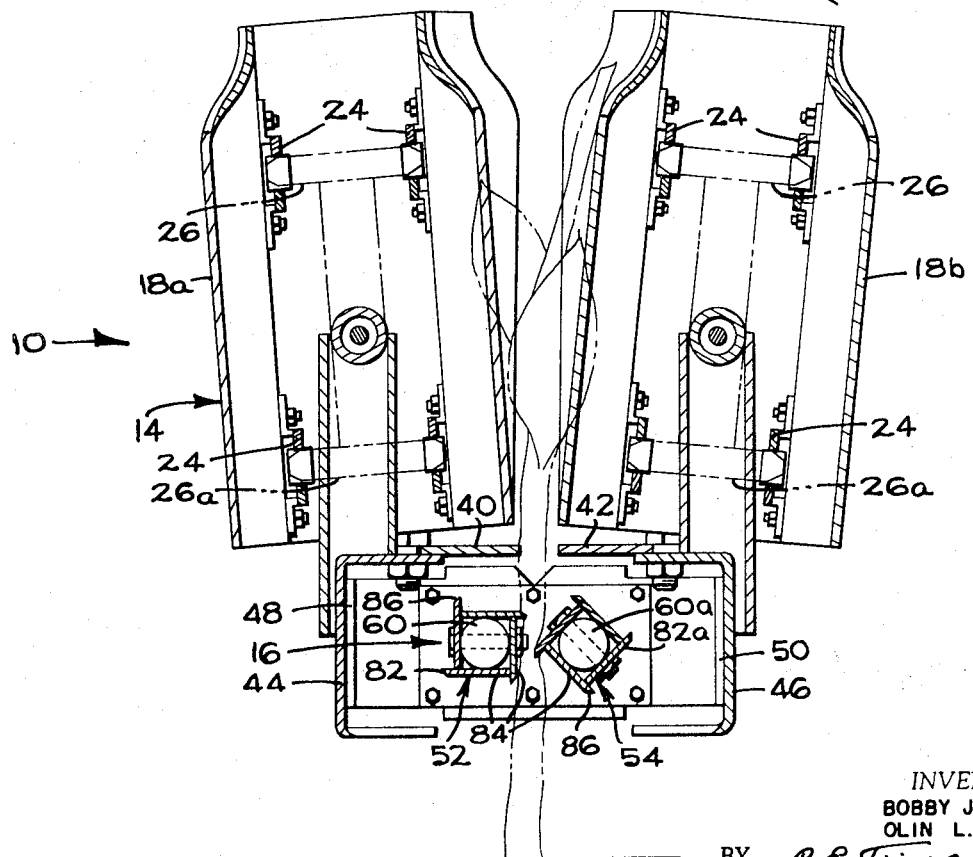
FIG_2
INVENTORS
BOBBY JOE SEARS
OLIN L. LOOKER
BY C.E. Tripp
F.W. Anderson
ATTORNEYS

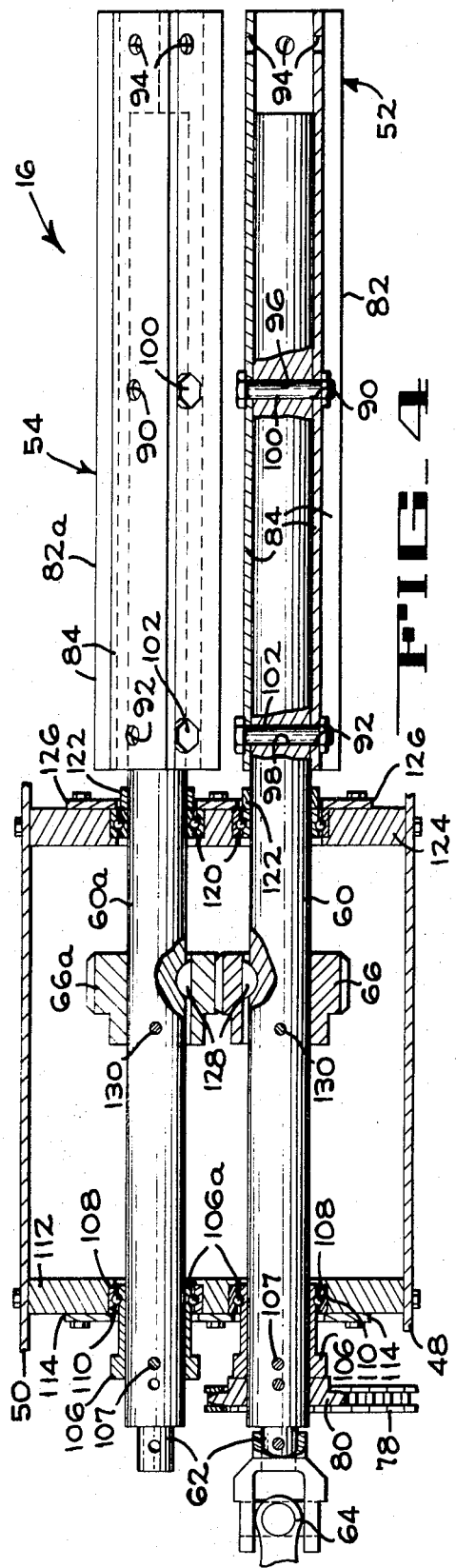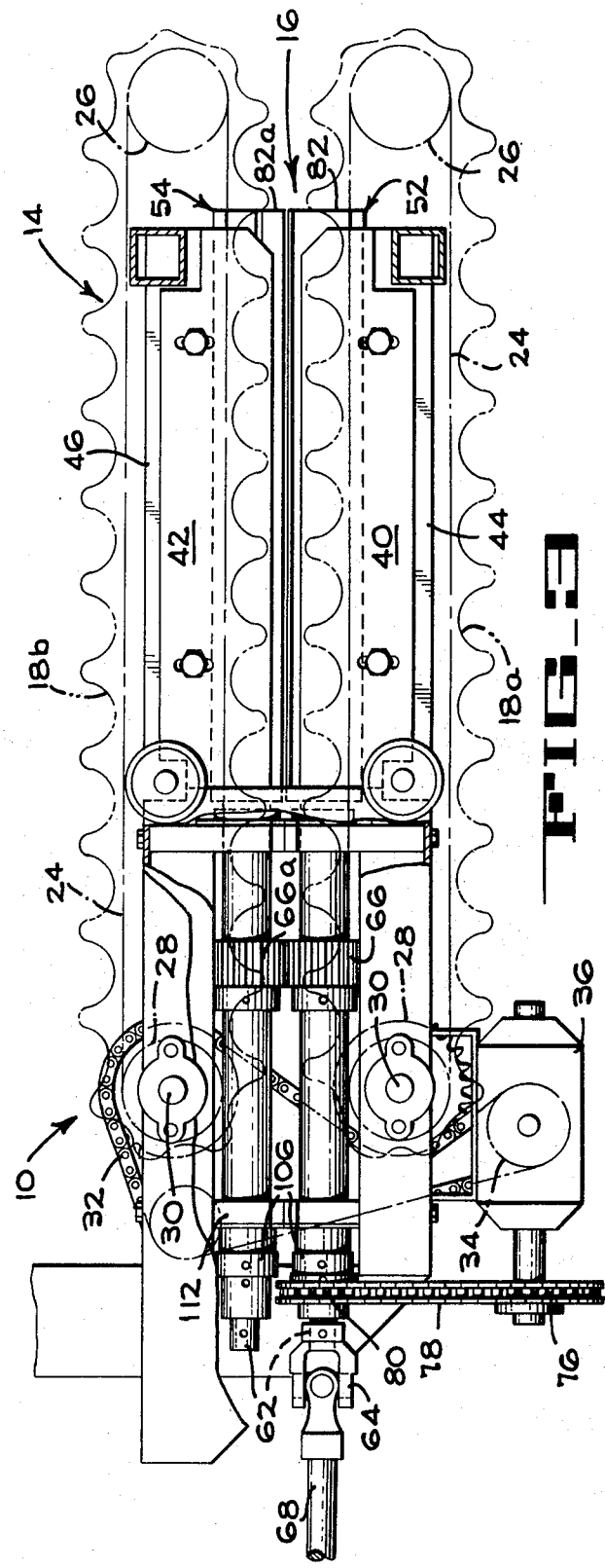

CORNPICKER HEAD WITH REVERSIBLE ROTOR BLADES

FIELD OF THE INVENTION

This invention relates to harvesting and more particularly to the cornpicker head for a corn harvester wherein the rotor blades are identical and are reversibly mounted on their shafts.

DESCRIPTION OF PRIOR ART

The use of four separate rotor blades bolted along their length to a square shaft is shown in the U.S. Pat. to Schaaf et al., No. 2,434,124, Jan. 6, 1948, and in the U.S. Pat. to Looker No. 3,429,111, Feb. 25, 1969.

The use of six blades welded together to form a sleevelike structure that is slipped over a hexagonal shaft is shown in the U.S. Pat. to Schaaf et al., No. 2,676,450, Apr. 27, 1954.

The U.S. Pat. to Fergason, No. 2,604,749, July 29, 1952, discloses right- and left-hand rotor blade assemblies wherein two blades are welded together to form an angle and two angles are bolted along their lengths to round shafts.

The U.S. Pat. to Karlsson et al., No. 3,262,255, July 26, 1966, discloses a square blade sleeve assembly having radial end flanges at each end of the blade assembly for mounting on the shafts, and with outboard bearings for the rotor shafts.

SUMMARY OF THE INVENTION

In accordance with the present invention, the use of outboard bearing supports for the rotor shafts as in the aforesaid Karlsson et al., patent is not required. Rather, the stripping rotors are mounted at their inner or upper ends in cantilever fashion. This results in a certain amount of deflection of the rotors. Where rows of bolts are required to hold the blades onto the rotor shafts as in the aforesaid Schaaf et al., U.S. Pat, No. 2,434,124 and the Looker patent as well as the assembly of the Fergason patent, the row of bolts disposed along the shafts presented difficulties. The bolts near the outer ends of the shafts break cornstalks at this area of greatest pulldown, resulting in more trash that must be handled and disposed of by the cleaning fans or the like. Also, the bolts become battered in service and the relatively large number of bolts complicates blade replacement.

The use of square shafts as in the Schaaf et al., U.S. Pat. No. 2,434,124 and the Looker patent requires machining the mounting ends of the shafts for the bearings and gears and results in a localized stress transition zone and structural weakness, unless the parts are made impractically heavy. In accordance with the present invention, the number of mounting bolts is reduced, particularly at the outer end of the rotor assembly and both the rotor shafts and the blade units therefor can be made of identical parts. This not only simplifiers manufacture, but makes it possible to produce both a left-hand and a right-hand blade unit from the same elements by simply mounting these units in relatively end-to-end inverted positions.

These advantages are accomplished under the present invention by making each rotor shaft in the form of a straight cylindrical shaft which can be ground and polished to eliminate local stress zones along its length, the shaft having the same major diameter along its length. A square, two-bladed sleeve is formed by welding identical blades together to form a boxlike structure that slips over the shaft. All blades are identical with each blade having a central bolt hole and symmetrically located end bolt holes. Only two bolt holes need be provided in the shaft which holes are aligned with the central and end bolt holes of the blade assembly and bolts are fitted through the aligned bolt holes. This leaves a free end portion of each tubular blade assembly (carrying one set of bolt holes) projecting out past the end of the rotor shaft. With this construction, no outboard bearings are required, all parts are identical and the blade sleeves can be reversed end-to-end so that both right- and left-hand rotors can be built up from identical tubular blade sleeves and rotor shafts.

BRIEF DESCRIPTION OF THE DRAWINGS

FIG. 1 is a side elevation of a corn harvester embodying the invention mounted on a farm tractor.

FIG. 2 is a section of the picker head taken on line 2—2 of FIG. 1.

FIG. 3 is an elevation of the picker head viewed from line 3—3 of FIG. 1.

FIG. 4 is a plan view of the shaft and rotor assembly with parts broken away.

FIG. 5 is an exploded perspective of the rotor assembly.

FIG. 6 is an enlarged end view of a pair of rotors embodying the invention.

FIGS. 1 and 2 illustrate an embodiment of the invention mounted on a farm tractor. As seen in FIG. 1, the harvester 10 is mounted on one side of the frame 11 of a farm tractor 12 in accordance with conventional practice in this art. The harvester is downwardly inclined and includes a picker head 14 embodying a picker roll assembly 16 forming a feature of the invention which pulls down the cornstalks and severs and strips the ears from the stalks. Sinuous gathering belts 18a and 18b (see FIG. 2) are mounted above the picking rotor assembly 16 for conveying the picked ears rearwardly, whereupon they are drawn into a screw conveyor 20 and dropped onto a rear delivery conveyor 22.

The details of the gathering belts 18a and 18b are not critical to the present invention and are fully described in the aforesaid U.S. Pat. to Looker No. 3,429,111 to which reference is made. Briefly the gathering belts are in the form of sinuous rubberlike belts, attached at intervals to endless chains 24 (FIG. 2). These chains are guided over front sprockets 26,26a and rear sprockets 28,28a (only the sprockets 28 being shown) on shafts 30 (FIG. 3). The shafts 30 are driven in opposite directions by a chain 32 and a sprocket 34 projecting from a right-angle gearbox 36.

Below the gathering conveyors 18a,18b are mounted stripper plates 40,42 (FIG. 2) which restrain the ears as the stalks are pulled down by the rotor assembly 16 and cause the ears to be detached from the stalks as knives on the rotor assemblies cut into the shanks below the ears. This structure is known in the art and is exemplified in the aforesaid Looker and other patents cited previously. The plates 40,42 are mounted on channel members 44,46 respectively which in turn cover longitudinal frame elements 48,50 that support the rotors in a manner to be described presently.

The rotor assembly 16 of the present invention will now be described in detail.

The rotor assembly combines two rotor subassemblies 52,54 and since a feature of the invention is that knife and shaft units of the rotor assemblies are identical only one need be described in detail.

Each rotor includes a cylindrical shaft 60,60a which is of uniform diameter along its length except for a turned down inner end 62 (FIG. 4) that mounts a universal joint 64 for driving the shaft 60. As can be seen in FIGS. 3 and 4 the turned down end 62 on the shaft 60a does not mount a universal joint for driving that shaft, because the driven shaft 60 mounts a gear 66 which is keyed to the shaft and is meshed with another gear 66a on the shaft 60a. Thus the shafts 60,60a are turned at the same speed but in opposite directions.

Figures 5, 6:
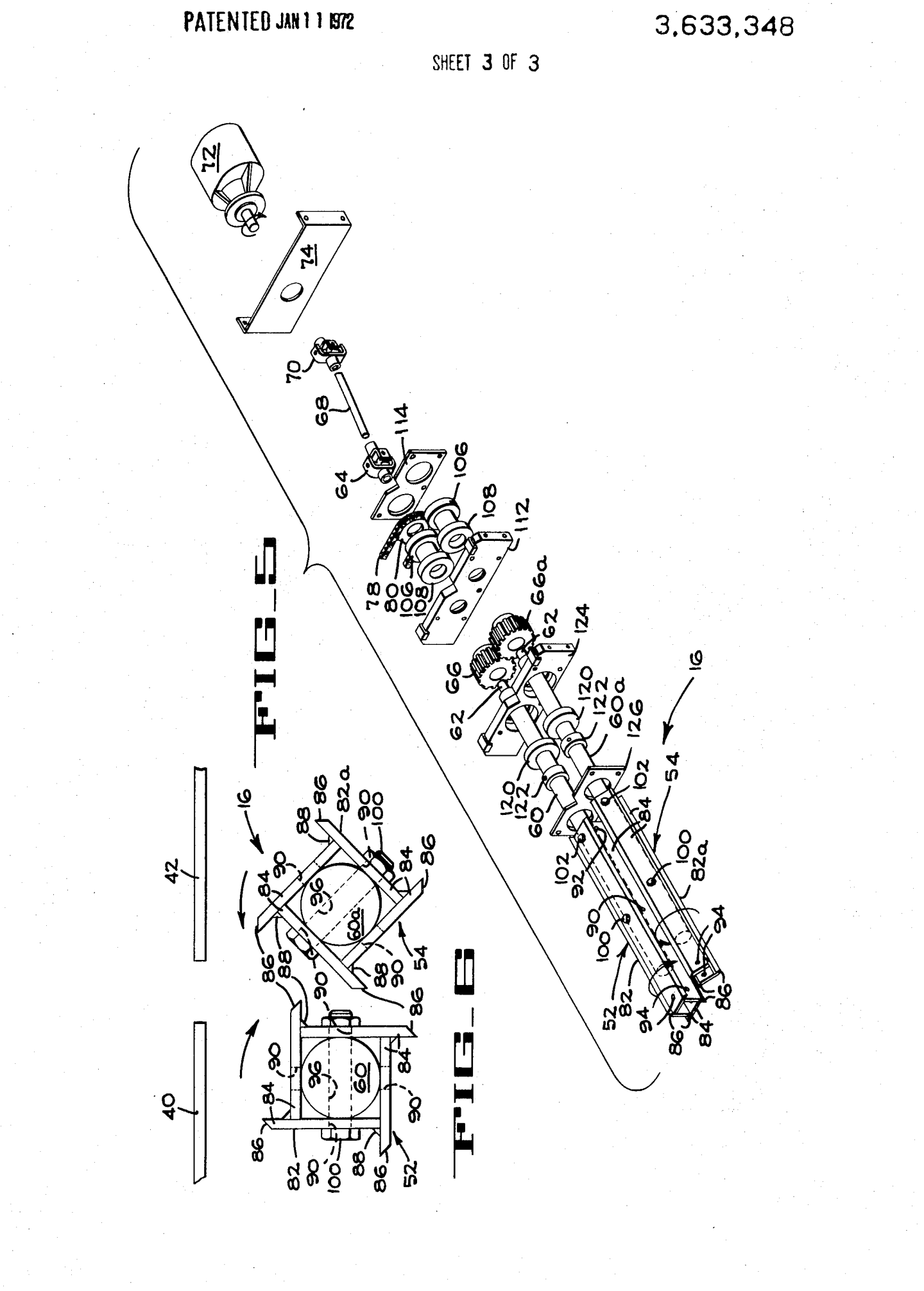

As seen in FIG. 5, universal joint 64 is driven by an intermediate shaft 68 and a second universal joint 70, the latter joint being driven by a hydraulic motor 72. The motor 72 is supported on a crosspiece 74 that is secured to a harvester frame element (not shown) in a manner which is not critical to the present invention. The gearbox 36 for operating the gathering belts 18a,18b (FIG. 3) is driven by a sprocket 76, a chain 78 and a sprocket 80 on the shaft 60 so that all parts are driven in synchronous timed relation.

Each of the rotor shafts 60,60a mounts a square, four-bladed knife assembly of tubular or sleevelike form. A knife assembly 82 is mounted on the shaft 60 and an identical knife assembly 82a is mounted on the shaft 60a. Since the knife assemblies 82,82a (on shafts 60,60a) are of identical construction, only the knife assembly 82 will be described in detail.

The knife assembly 82 is made up of four blades 84, each of which has a sharpened edge 86 (FIG. 6). The blades are welded at 88 in what might be termed an overlapping construction, to form a square sleeve. Each blade 84 is provided with a bolt hole 90 at its longitudinal midportion (FIG. 4) and bolt holes 92,94 at its ends. The spacing between the end bolt holes 92,94 and the central bolt hole 90 are equal and hence when the blades are welded to form a square sleeve, the bolt holes in opposed blades are diametrically aligned. The shafts 60,60a are each provided with two bolt holes, an intermediate bolt hole 96 (FIG. 4) which can be aligned with the central bolt holes 90 in the blades 84 and an inner bolt hole 98 which can be aligned with either set of bolt holes 92,94 at the ends of the blades. In this manner, and in accordance with the present invention, either knife sleeve 82 or 82a can be slipped over and bolted to either shaft 60,60a.

A central blade-mounting bolt 100 passes through the shaft aperture 96 and the apertures 90 in opposed blades 84. Also, an inner end mounting bolt 102 passes through the shaft aperture 98 and opposed blade apertures 92.

Since no bolts are disposed adjacent the ends of the rotor assemblies (where the pulldown and cutting action is the greatest and the deflection force is the highest), there is no interference with the cutting and pulling action of the blades in these zones. Furthermore there are no outer bolts and nuts to become battered and rendered difficult to disassemble when it is necessary to replace or resharpen blade sleeve units. This is an additional advantage incidental to the reversible end-to-end mounting features of the invention just described. The central bolts 100, being displaced inwardly from the ends of the rotor assemblies, are disposed rearwardly of the zone of greatest pulldown, and hence provide a minimum interference with that action. Also, rotor deflection and eccentricity is small at the bolts, which minimizes battering of the boltheads and nuts due to rotor deflection. Removal of the blade sleeve is simplified—only two bolts per sleeve need be removed and these will not be battered in service.

As previously mentioned, another feature of the present invention is that shafts 60,60a can be identical and are of a uniform major diameter along their lengths. This facilitates grinding and polishing the shafts along their length to produce a surface that is free from cracks or zones that will induce localized stresses.

Details of the means for mounting the shafts in the harvester are not critical to the present invention but are illustrated in FIGS. 4 and 5. Since the mountings are identical, only that shaft 60 will be described in detail. A sleeve 106 is pinned at 107 to the shaft just inside of the gathering belt drive sprocket 78 previously mentioned. The outer end of the sleeve 106 forms the inner race 106a of an inner friction bearing and the outer bearing race 108 fits snugly in a bore 110, formed in a bearing plate 112. The bearing plate 112 is secured at opposite ends to the longitudinal frame members 48,50 previously mentioned. The outer bearing race 108 is retained in the mounting plate 112 by a retainer plate 114.

At the blade end of the shaft the inner race of a ball bearing 120 is adjacent a collar 122 at the inner ends of the knife blades 84. The outer race of the bearing 120 is mounted in a bearing plate 124 that is likewise secured between the longitudinal frame members 48,50, and the outer race is retained in the bearing plate by an apertured retainer plate 126. Also, as seen in FIG. 4, the gear 66 on shaft 60 (as well as the gear 66a on the shaft 60a is keyed to the shaft by a Woodruff key 128 and is axially retained on the shaft by a pin 130.

In operation, as the tractor bearing the corn harvester of the present invention proceeds along a row of corn, the motor 72 (FIG. 5) drives the shaft 60 which in turn drives the shaft 60a by means of meshed gears 66,66a. This action causes the rotors to rotate in opposite directions (as seen in FIG. 6) with the knife blades approaching one another and moving downwardly to grip the cornstalks and cut into the shanks of the ears, the latter being restrained by the stripping plates 40,42. The detached ears are brought by the gathering belts 18a,18b to the conveyor 20 as previously described and disposed of in a well-known manner. Since only two bolts 100,102 are required to retain each blade sleeve in the shaft and since even the most forward bolt (bolt 100) is a substantial distance inwardly from the end of the cantilever supporting blades, deflection of the shafts at the bolts and battering of the bolts is minimized and replacement of the blades is facilitated. As previously mentioned, since the blade assemblies 82,82a are identical and formed of identical welded blade units 84, the blade assemblies can be mounted in either of the two possible end-to-end positions thereby making it possible to provide, with identical blades and shafts, a counterrotation relationship of the units as illustrated in FIG. 6.

Although the best mode contemplated for carrying out the present invention has been herein shown and described, it will be apparent that modification and variation may be made without departing from what is regarded to be the subject matter of the invention.

What is claimed is:

1. In a corn harvester of the type having longitudinally spaced, transverse frame elements, paired rotor shafts rotatably supported in said frame elements and projecting forwardly therefrom, blades mounted on the projecting shaft portions and means for synchronously driving said rotor shafts; the improvement wherein said rotor shafts are cylindrical and of uniform diameter from the rearward frame element to their forward ends, said blades comprising identical tubular members each formed by four overlapping blades welded together to form a square sleeve having a long, square section bore that snugly fits over either rotor shaft, each blade sleeve having aligned bolt holes therethrough at its midportion and adjacent and equidistant from both ends, bolt holes in each rotor shaft aligned with the bolt holes at the midportion and at one end of said blade sleeve, the spacing as well as the angular relations between the end bolt holes and the midportion bolt hole of each sleeve being equal so that each blade sleeve can be reversibly mounted on either rotor shaft, and a bolt through each set of aligned bolt holes.

2. The harvester of claim 1 wherein said rotor shafts are polished to remove localized stress zones.

* * * * *